US008857203B2

(12) United States Patent
Hodgson

(10) Patent No.: US 8,857,203 B2
(45) Date of Patent: Oct. 14, 2014

(54) PERSONAL THERMAL REGULATION SYSTEM

(75) Inventor: Edward W. Hodgson, Granby, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 260 days.

(21) Appl. No.: 13/413,213

(22) Filed: Mar. 6, 2012

(65) Prior Publication Data

US 2013/0233000 A1 Sep. 12, 2013

(51) Int. Cl.
*F25D 3/00* (2006.01)

(52) U.S. Cl.
USPC ............. 62/259.3; 62/272; 62/283; 62/112; 62/457.9; 165/46

(58) Field of Classification Search
USPC ............. 62/56, 150, 272, 283, 103, 101, 141, 62/457.9, 476, 112, 207, 529.3, 529, 530; 165/46; 2/171.3
See application file for complete search history.

(56) References Cited

U.S. PATENT DOCUMENTS

| 3,174,300 | A | * | 3/1965 | Webb | 62/259.3 |
|---|---|---|---|---|---|
| 3,212,286 | A | * | 10/1965 | Curtis | 62/259.3 |
| 3,316,732 | A | * | 5/1967 | Burton | 62/259.3 |
| 3,463,150 | A | * | 8/1969 | Penfold | 128/202.11 |
| 3,487,765 | A | | 1/1970 | Lang | |
| 3,537,668 | A | | 11/1970 | Kosmo et al. | |
| 3,751,727 | A | | 8/1973 | Shepard et al. | |
| 4,007,601 | A | * | 2/1977 | Webbon | 62/100 |
| 4,691,762 | A | * | 9/1987 | Elkins et al. | 165/46 |
| 4,842,224 | A | | 6/1989 | Cohen | |
| 5,092,129 | A | * | 3/1992 | Bayes et al. | 62/3.3 |
| 5,111,668 | A | * | 5/1992 | Parrish et al. | 62/259.3 |
| 5,291,750 | A | | 3/1994 | Parrish et al. | |
| 5,363,663 | A | * | 11/1994 | Chen | 62/99 |
| 5,399,418 | A | | 3/1995 | Hartmanns et al. | |
| 5,946,931 | A | | 9/1999 | Lomax et al. | |
| 6,584,798 | B2 | * | 7/2003 | Schegerin | 62/386 |
| 7,089,995 | B2 | | 8/2006 | Koscheyev et al. | |
| 2003/0033829 | A1 | | 2/2003 | Smith et al. | |
| 2006/0036304 | A1 | * | 2/2006 | Cordani et al. | 607/108 |
| 2006/0201187 | A1 | * | 9/2006 | Smolko et al. | 62/315 |
| 2006/0277933 | A1 | * | 12/2006 | Smith et al. | 62/259.3 |
| 2008/0060101 | A1 | | 3/2008 | Cadogan | |

OTHER PUBLICATIONS

Izenson et al., "Nonventing Thermal and Humidity Control for EVA Suits", American Institute of Aeronautics and Astronautics, Int. Con. Environ. Syst. (41): pp. 1-19, (Jun. 6, 2011).
Izenson et al., "Advanced Design Heat Pump/Radiator for EVA Suits", SAE International, Technical Paper No. 2009-01-2406, pp. 1-17 (2009).

(Continued)

*Primary Examiner* — Allana Lewin
*Assistant Examiner* — Kun Kai Ma
(74) *Attorney, Agent, or Firm* — Cantor Colburn LLP

(57) ABSTRACT

A personal thermal regulation system includes a personal liquid cooling garment, wherein the personal liquid cooling garment is configured to circulate a working fluid therein, a membrane evaporator configured to receive circulated working fluid from the personal liquid cooling garment, wherein the membrane evaporator is further configured to evaporate a portion of the received circulated working fluid, and a chemical absorber in fluid communication with the membrane evaporator, wherein the chemical absorber is configured to receive a controlled flow of the evaporated portion of the received circulated working fluid from the membrane evaporator.

9 Claims, 2 Drawing Sheets

(56) References Cited

OTHER PUBLICATIONS

Bue et al., "Hollow Fiber Flight Prototype Spacesuit Water Membrane Evaporator Design and Testing", SAE Int. J. Aerosp. 4(1): pp. 130-140, 2011.

Izenson et al., "Zero-Venting, Regenerable, Lightweight Heat Rejection for EVA Suits", SAE Technical Paper, 2005-01-2974: pp. 1-11, 2005.

European Search Report for Application No. 13157936.9-1754 Mailed on Oct. 2, 2013. 8 Pages.

Metts, et al. "Equivalent System Mass Analysis for Space Suit Thermal Control". AIAA-2011-5180, 41st International Conference on Environmental systems, Jul. 17-21, 2011. 8 pages.

Vogel, et al. "Spacesuit Water Membrane Evaporator Development for Lunar Missions" Proceedings of the International Conference on Environmental Systems, San Francisco, CA Jun. 29-Jul. 3, 2008. 9 pages.

* cited by examiner

PERSONAL THERMAL REGULATION SYSTEM

BACKGROUND OF THE INVENTION

The present invention is directed to personal thermal regulation systems, and more particularly, exemplary embodiments of the present invention are directed to integrated thermal regulation systems for extra-vehicular activities.

Generally, extra-vehicular activity ("EVA") in autonomous spacesuits has relied on evaporating water as an expendable heat sink in order to achieve thermal regulation. However, open-loop water-evaporation results in water being a limiting consumable during the EVA duration and a significant design driver for spacesuit systems. Water is also a significant mission launch mass penalty when EVA is frequent. Radiation has also been recognized as an attractive alternative to water-evaporation for heat regulation, but it has not been successfully implemented in a spacesuit system. Radiation is limited by the limited practical and available radiating surface area in a spacesuit system, source temperature (i.e., essentially human skin temperature), and radiation sink temperatures which have provided less than required heat regulation capacity during a large percentage of EVA scenarios.

BRIEF DESCRIPTION OF THE INVENTION

According to an exemplary embodiment of the present invention, a personal thermal regulation system includes a personal liquid cooling garment. The personal liquid cooling garment is configured to circulate a working fluid therein. The system further includes a membrane evaporator configured to receive circulated working fluid from the personal liquid cooling garment. The membrane evaporator is further configured to evaporate a portion of the received circulated working fluid. Furthermore, the system also includes a chemical absorber in fluid communication with the membrane evaporator, and the chemical absorber is configured to receive a controlled flow of the evaporated portion of the received circulated working fluid from the membrane evaporator.

According to yet another exemplary embodiment of the present invention, a method of personal thermal regulation includes initializing a personal thermal regulation system. The personal thermal regulation system includes a personal liquid cooling garment, a membrane evaporator configured to receive circulated working fluid from the personal liquid cooling garment, and a chemical absorber in fluid communication with the membrane evaporator. The method also includes receiving an outlet temperature from the membrane evaporator, and adjusting a flow of evaporated working fluid between the membrane evaporator and the chemical absorber in response to the outlet temperature.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

According to exemplary embodiments of the present invention, a solution has been provided as compared to conventional thermal regulation systems which significantly increases personal temperature control while being both practical and beneficial for total spacesuit/system mass, functional capability, and reliability. In exemplary embodiments, a chemical absorber and radiator are integrated with a personal liquid cooling garment and membrane evaporator for heat acquisition and transport. Vapor from the evaporator is ducted efficiently to the radiator, thereby regulating temperature efficiently.

Figure 1:
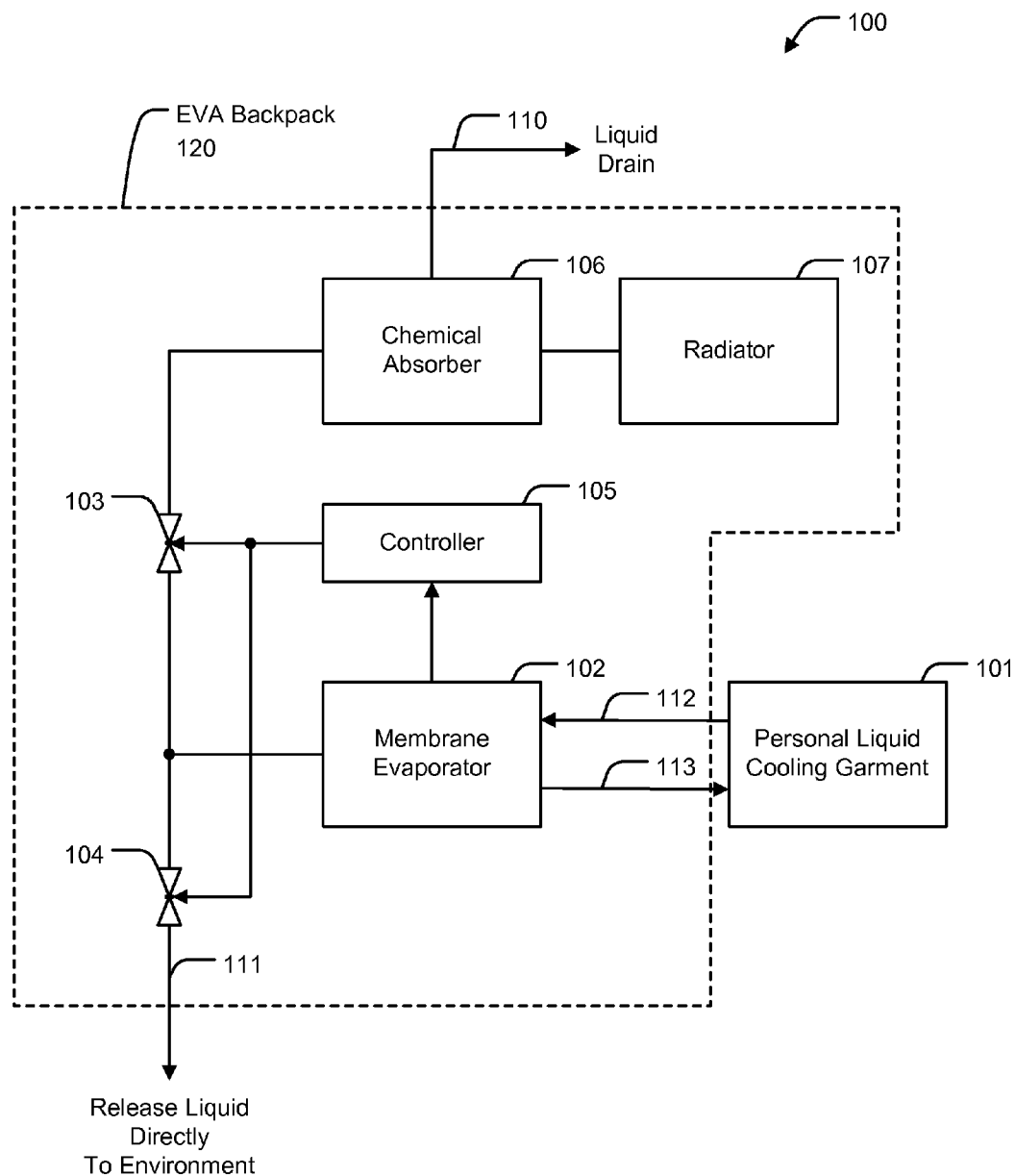
FIG. 1 is a personal thermal regulation system, according to an exemplary embodiment of the present invention.

Turning to FIG. 1, a personal thermal regulation system is illustrated. The system 100 includes a personal liquid cooling garment 101 in fluid communication with EVA backpack/life support system 120. The garment 101 may be, for example, any suitable liquid cooling garment which receives a working fluid (e.g., water) from conduit 113, circulates the working fluid about a person's body (e.g., through tubing proximate skin/body surface) from within the garment 101, and outputs the circulated working fluid through conduit 112. For example, the working fluid may be received from and outputted to a membrane evaporator 102 as illustrated in FIG. 1.

The membrane evaporator 102 may be an evaporator configured to receive working fluid from the garment 101, evaporate a portion of the received working fluid into fluid vapor, output the vapor to a plurality of control valves 103-104, and output non-evaporated working fluid back to the garment 101.

According to one embodiment of the present invention, the membrane evaporator is a water membrane evaporator ("WME").

According to another embodiment, the WME includes a structural support, a hydrophobic membrane that is permeable to water vapor and supported by the structural support, and a hydrophilic membrane configured to transport received water from the garment 101 to an inner surface of the hydrophobic membrane.

In operation, received water saturates the hydrophilic membrane and is retained by the hydrophobic membrane. A liquid/vapor interface at the hydrophobic membrane causes water to evaporate to vapor, which is subsequently outputted. Makeup water flows back into the hydrophilic membrane through gaps between the structural support and, subsequently, back into the garment 101.

Turning back to FIG. 1, the system 100 further includes control valves 103 and 104 in fluid communication with the membrane evaporator 102. Control valve 104 may be configured to release vaporized working fluid directly to an exterior environment (e.g., Space) through channel 111 (e.g., exit channel or nozzle). The release functionality of control valve 104 is controlled and regulated to avoid over-chilling a person wearing the liquid cooling garment 101. Control valve 103 may be configured to control a flow of vaporized working fluid to a chemical absorber 106. Thus, the chemical absorber 106 is in fluid communication with the membrane evaporator through the control valve 103. The system 100 further includes radiator 107 in thermal communication with the chemical absorber 106.

According to one embodiment of the present invention, the chemical absorber 106 includes a chemical-based sorbent material, for example, a lithium chloride adsorbing material, configured to absorb vaporized working fluid and transmit associated heat to the radiator 107. Furthermore, the chemical-based sorbent may be fixedly attached or integrated with the radiator 107 within a single package to provide an absorber/radiator assembly easily mounted onto the EVA backpack/life support system 120.

It should be understood that as heat is transported to the radiator 107 from the vaporized working fluid absorbed at the absorber 106, the working fluid may condense. This condensed working fluid may be drained at liquid drain 110, retained in a fluid reservoir for future EVA use, or treated/recirculated through the garment 101 through additional components.

Turning back to FIG. 1, the system 100 further includes system controller 105 in signal communication with the membrane evaporator 102 and control valves 103-104. The controller 105 may be any suitable controller having a processor and memory for storing instructions that is configured to receive temperature information from the membrane evaporator 102, process the temperature information to determine a necessary cooling action, and translate the necessary cooling action into control valve positions for control valve 103 and 104. The controller 105 may also be a computer processor, microprocessor, microcontroller, application-specific integrated circuit, or any other suitable controller.

As illustrated in FIG. 1, a portion or all of the membrane evaporator 102, the control valves 103-104, controller 105, chemical absorber 106, and radiator 107 may be arranged on or within EVA backpack 120.

According to exemplary embodiments, a plurality of temperature set points related to target evaporator temperature or outlet temperature may be stored at controller 105. If a received temperature of the membrane evaporator 102 is within a first target range of thresholds, control valve 104 may remain closed, and control valve 103 may be opened slightly to begin to remove vaporized working fluid from the evaporator 102. If the received temperature rises above the first target range of threshold to a second target range of thresholds, the control valve 103 may be opened more to increase a speed of thermal transfer from the garment 101 to the absorber 106/radiator 107. Thereafter, if the received temperature rises beyond the second target range of thresholds, the control valve 104 may be opened to vent vaporized working fluid directly to the exterior environment, thereby rejecting a large amount of heat required to reduce the outlet temperature of the membrane evaporator to within either the first or second target range of temperature thresholds.

Additionally, temperature thresholds referenced above may be dynamically controlled and/or adjusted based on a plurality of possible variables. For example, temperature thresholds may be adjusted based on system data received from a portion of the system 100, such as the wearer's metabolic rate (i.e., work rate) as measured from any suitable sensor embedded in the garment 101, as well as user input based on thermal comfort or discomfort which may be received from a user input device (not illustrated).

Figure 2:
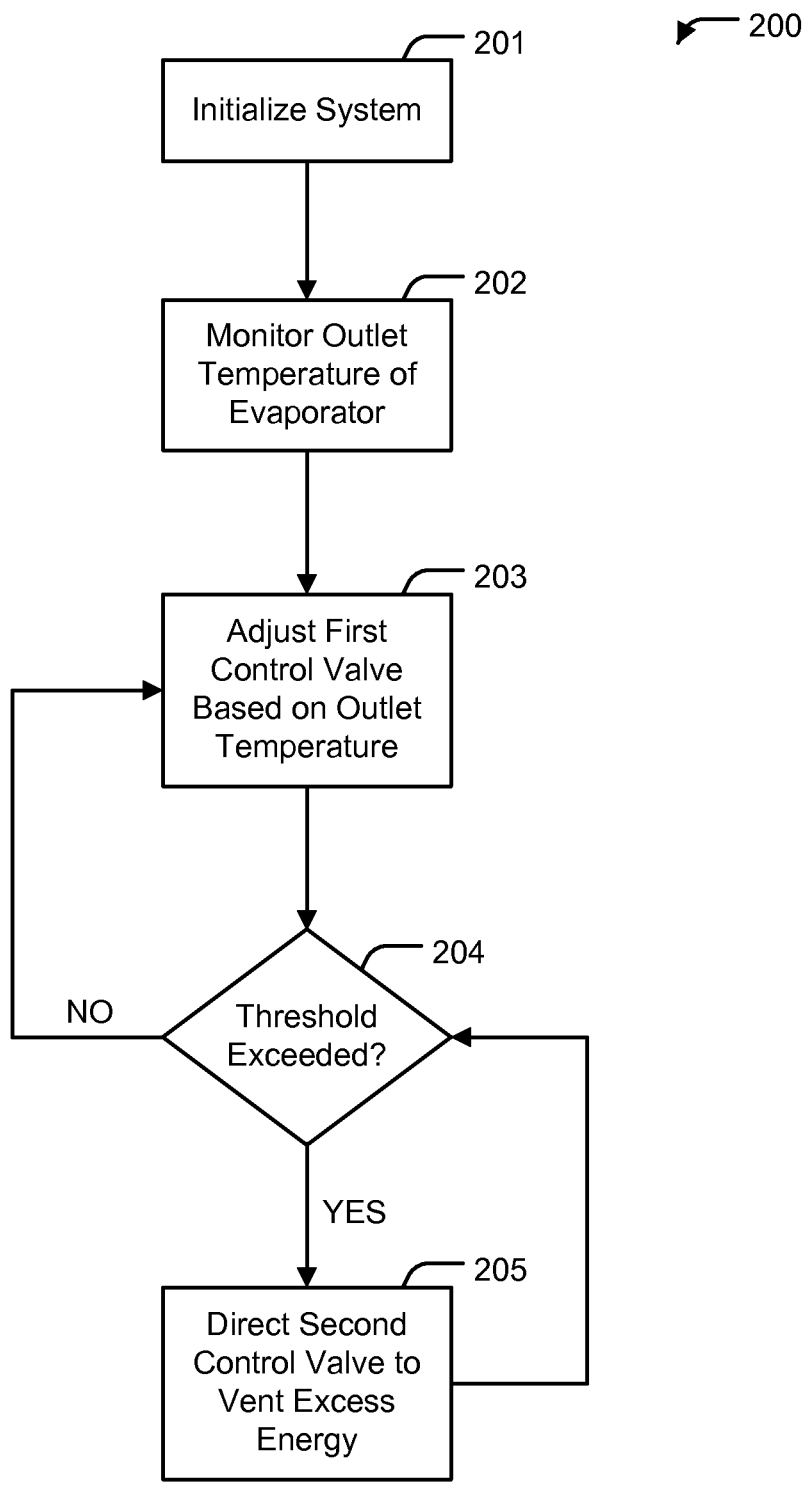
FIG. 2 is a method of personal thermal regulation, according to an exemplary embodiment of the present invention.

A flowchart of a method depicting these and other operations is illustrated in FIG. 2.

Turning to FIG. 2, the method 200 includes initializing the system 100 at block 201. For example, initializing the system 100 may include pressurizing a working fluid in the garment 101 to ensure circulation of fluid between the garment 101 and the membrane evaporator 102, closing control valve 104 to ensure vapor is not released into the exterior environment, and closing or initializing control valve 103 to a rest or initial position.

The method 200 further includes monitoring an outlet temperature of the membrane evaporator 102 at block 202. Monitoring the outlet temperature may be facilitated by the controller 105, for example, by requesting and/or receiving the outlet temperature from the evaporator 102. Thereafter, or during continual monitoring of the outlet temperature, the method 200 includes adjusting the first control valve 103 based on the outlet temperature.

For example, adjusting the first control valve 103 may include performing any of the adjustments described above according to monitored temperature being within any number of desired target range of adjustable thresholds. The control valve 103 may be continually adjusted (e.g., loop through blocks 203-204) until a determination is made at block 204 that an overall threshold has been exceeded. The overall threshold may be a temperature value or range at which actions of the chemical absorber 106 and radiator 107, while the control valve 103 is fully open, can no longer maintain or reduce appropriate temperature levels for the garment 101.

Subsequent to determining the overall temperature threshold has been exceeded, the method 200 includes directing the second control valve 104 to vent vaporized working fluid directly to the exterior environment until the monitored outlet temperature is within predetermined or desired limits. Thereafter, the control valve 104 may be closed, and the control valve 103 may again be continually adjusted.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A personal thermal regulation system, comprising: a personal liquid cooling garment, wherein the personal liquid cooling garment is configured to circulate a working fluid therein; a membrane evaporator configured to receive circulated working fluid from the personal liquid cooling garment, wherein the membrane evaporator is further configured to evaporate a portion of the received circulated working fluid; a chemical absorber in fluid communication with the membrane evaporator, wherein the chemical absorber is configured to receive a controlled flow of the evaporated portion of the received circulated working fluid from the membrane evaporator; a first control valve disposed to control the flow of the evaporated portion between the membrane evaporator and the chemical absorber; a second control valve disposed to vent the evaporated portion to an exterior environment based on an outlet temperature of the membrane evaporator; a controller in signal communication with the first control valve, the second control valve, and the membrane evaporator, wherein the controller is configured to vary the position of the first control valve and the second control valve in response to a received outlet temperature of the membrane evaporator.

2. The system of claim 1, further comprising:
   a radiator in thermal communication with the chemical absorber, wherein the radiator is disposed to exchange heat with the evaporated portion absorbed by the chemical absorber.

3. The system of claim 2, wherein the chemical absorber and the radiator are integrated into a single package.

4. The system of claim 1, wherein the chemical absorber and the membrane evaporator are arranged within a personal life support system of a space suit.

5. The system of claim 4, wherein the personal liquid cooling garment is arranged within the space suit.

6. The system of claim 1, wherein the membrane evaporator is a water membrane evaporator.

7. The system of claim 6, wherein the water membrane evaporator comprises:

a structural support;

a hydrophobic membrane permeable to water vapor and supported by the structural support; and a hydrophilic membrane configured to transport the received circulated working fluid to an inner surface of the hydrophobic membrane.

8. The system of claim 7, wherein a liquid/vapor interface at the hydrophobic membrane causes working fluid to evaporate to vapor for output to the chemical absorber.

9. The system of claim 1, wherein the chemical absorber comprises:

a lithium chloride adsorbing material configured to absorb vaporized working fluid.

* * * * *